United States Patent

Stavely

(10) Patent No.: US 7,791,643 B2
(45) Date of Patent: Sep. 7, 2010

(54) SEQUENCED RESPONSE IMAGE STABILIZATION

(75) Inventor: Donald J. Stavely, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1316 days.

(21) Appl. No.: 11/046,368

(22) Filed: Jan. 28, 2005

(65) Prior Publication Data

US 2006/0170782 A1    Aug. 3, 2006

(51) Int. Cl.
   H04N 5/228    (2006.01)
   G03B 17/00    (2006.01)

(52) U.S. Cl. ............ 348/208.2; 348/208.3; 348/208.11; 396/55

(58) Field of Classification Search ............ 348/208.99, 348/208.2, 208.3, 208.7, 208.8, 208.11; 396/52, 396/53, 55; H04N 5/228
See application file for complete search history.

(56) References Cited

U.S. PATENT DOCUMENTS

| | | | |
|---|---|---|---|
| 4,448,510 A | | 5/1984 | Murakoshi |
| 4,623,930 A * | | 11/1986 | Oshima et al. ........... 348/208.5 |
| 5,253,071 A * | | 10/1993 | MacKay ................ 348/208.11 |
| 5,534,967 A | | 7/1996 | Matsuzawa |
| 5,774,266 A | | 6/1998 | Otani et al. |
| 5,943,512 A | | 8/1999 | Hamada et al. |
| 6,101,332 A | | 8/2000 | Satoh |
| 6,198,504 B1 * | | 3/2001 | Nobuoka ................. 348/208.3 |
| 6,233,009 B1 * | | 5/2001 | Morofuji et al. ......... 348/208.8 |
| 6,301,440 B1 | | 10/2001 | Bolle et al. |
| 6,388,705 B1 * | | 5/2002 | Kawahara et al. ...... 348/208.99 |
| 6,628,898 B2 * | | 9/2003 | Endo ..................... 348/208.99 |
| 6,687,458 B2 * | | 2/2004 | Masuda ................. 348/208.99 |
| 6,734,901 B1 * | | 5/2004 | Kudo et al. .............. 348/208.4 |
| 6,734,902 B1 * | | 5/2004 | Kawahara ................ 348/208.8 |
| 6,778,767 B2 * | | 8/2004 | Yamazaki ..................... 396/55 |
| 6,778,768 B2 * | | 8/2004 | Ohkawara et al. ............. 396/55 |
| 6,933,968 B2 * | | 8/2005 | Yamazaki .............. 348/208.12 |
| 6,963,361 B1 * | | 11/2005 | Kawahara et al. ...... 348/208.99 |
| 7,064,777 B2 * | | 6/2006 | Yamazaki ................ 348/208.5 |
| 7,212,231 B2 * | | 5/2007 | Ohta ....................... 348/208.3 |
| 7,292,270 B2 * | | 11/2007 | Higurashi et al. ........ 348/208.3 |
| 7,430,000 B2 * | | 9/2008 | Yamazaki .............. 348/208.12 |
| 7,496,289 B2 * | | 2/2009 | Yamazaki ..................... 396/55 |
| 7,557,831 B2 * | | 7/2009 | Yamazaki ................ 348/208.6 |
| 2002/0047906 A1 * | | 4/2002 | Ohta .......................... 348/208 |
| 2003/0067544 A1 * | | 4/2003 | Wada ...................... 348/208.7 |
| 2005/0052538 A1 * | | 3/2005 | Sato et al. ................ 348/208.1 |
| 2005/0140793 A1 * | | 6/2005 | Kojima et al. .......... 348/208.99 |
| 2006/0170783 A1 * | | 8/2006 | Stavely et al. ............ 348/208.6 |
| 2007/0146488 A1 * | | 6/2007 | Higurashi et al. ........ 348/208.3 |

FOREIGN PATENT DOCUMENTS

| | | |
|---|---|---|
| JP | 11183951 A | 7/1999 |
| JP | 2003107552 A | 4/2003 |
| JP | 2004260525 A * | 9/2004 |

\* cited by examiner

*Primary Examiner*—John M Villecco

(57) ABSTRACT

A method and apparatus are described wherein the composition responsiveness of a camera comprising an image stabilization system is adjusted. In example embodiments, the composition responsiveness may be adjusted in response to a particular photographic situation, including a scene condition, a camera optical configuration, a camera mode setting, or any combination of these. In another embodiment of the invention, the composition responsiveness is adjusted during a capture sequence used to take a photograph.

23 Claims, 7 Drawing Sheets

EXPOSURE PROGRAM TABLE

| SCENE BRIGHTNESS (BV) | APERTURE | SHUTTER TIME | COMPOSITION RESPONSIVENESS | ISO RATING |
|---|---|---|---|---|
| -1 | F/2.8 | 1/8 | SLOW | 400 |
| 0 | F/2.8 | 1/8 | SLOW | 200 |
| 1 | F/2.8 | 1/8 | SLOW | 100 |
| 2 | F/2.8 | 1/15 | SLOW | 100 |
| 3 | F/5.6 | 1/8 | SLOW | 100 |
| 4 | F/5.6 | 1/15 | SLOW | 100 |
| 5 | F/5.6 | 1/30 | MEDIUM | 100 |
| 6 | F/5.6 | 1/60 | MEDIUM | 100 |
| 7 | F/5.6 | 1/125 | MEDIUM | 100 |
| 8 | F/5.6 | 1/250 | FAST | 100 |
| 9 | F/5.6 | 1/500 | FAST | 100 |
| 10 | F/5.6 | 1/1000 | FAST | 100 |
| 11 | F/5.6 | 1/1000 | FAST | 50 |

| | EVENT | CAMERA/USER ACTIVITY | COMPOSITION RESPONSIVENESS |
|---|---|---|---|
| 1301 | (IDLE) | FRAMING (COMPOSITION) | FAST |
| 1302 | S1 | AUTOFOCUS (AF) | SLOW |
| 1303 | (AF DONE/ LOCKED) | RE-FRAMING (COMPOSITION) | FAST |
| 1304 | S2 | EXPOSURE | SLOW |
| 1305 | (DONE) | READY FOR NEXT SHOT | FAST |

FIG. 13

SEQUENCED RESPONSE IMAGE STABILIZATION

CROSS REFERENCE TO RELATED APPLICATION

This application is related to the following application, which is filed on the same date as this application, and which is assigned to the assignee of this application:
Adaptive response image stabilization (U.S. application Ser. No. 11/046,374).

FIELD OF THE INVENTION

The present invention relates generally to photography, and more specifically to image stabilization.

BACKGROUND OF THE INVENTION

Image blur caused by camera shake is a common problem in photography. The problem is especially acute when a lens of relatively long focal length is used, because the effects of camera motion are magnified in proportion to the lens focal length. Many cameras, including models designed for casual "point and shoot" photographers, are available with zoom lenses that provide quite long focal lengths. Especially at the longer focal length settings, camera shake may become a limiting factor in a photographer's ability to take an unblurred photograph, unless corrective measures are taken.

Some simple approaches to reducing blur resulting from camera shake include placing the camera on a tripod, and using a faster shutter speed. However, a tripod may not be readily available or convenient in a particular photographic situation. Using a faster shutter speed is not always feasible, especially in situations with dim lighting. Shutter speed may be increased if a larger lens aperture is used, but larger-aperture lenses are bulky and expensive and not always available. In addition, the photographer may wish to use a smaller lens aperture to achieve other photographic effects such as large depth of field.

Various devices and techniques have been proposed to help address the problem of image blur due to camera shake. For example, Murakoshi (U.S. Pat. No. 4,448,510) uses an accelerometer to detect camera shake, and provides an indication to the user of the camera if the acceleration exceeds a threshold level. The photographer can then make appropriate adjustments.

Satoh (U.S. Pat. No. 6,101,332) also senses camera shake, and combines the shake information with other camera parameters to estimate how much image blur might result. A set of light emitting diodes communicates the estimate to the photographer, who can then make adjustments.

Another approach has been to automate the camera operation, and let the camera choose settings that will minimize blur. For example, Bolle et al. (U.S. Pat. No. 6,301,440) applies a variety of image analysis techniques in an attempt to improve several aspects of photographs.

Some cameras or lenses are equipped with image stabilization mechanisms that sense the motion of the camera and move optical elements in such a way as to compensate for the camera shake. See for example Otani et al. (U.S. Pat. No. 5,774,266) and Hamada et al. (U.S. Pat. No. 5,943,512).

In a digital camera, the photosensitive element is an electronic array light sensor onto which a scene image is projected by the camera's lens. Some recent digital cameras compensate for camera shake by moving the sensor in relation to the lens during the exposure in response to camera motions so that the sensor approximately follows the scene image projected onto it, thus reducing blur.

Some digital cameras, especially video cameras, rather than move the electronic array light sensor, dynamically select a subregion of the sensor from which to take a photograph. The subregion selection is made in response to camera motion so that camera shake is compensated.

When an active stabilization technique is used, whether motion of an optical element, motion of an electronic array light sensor, or dynamic sensor region selection, the designer of the camera makes a compromise between compensating for camera motion that is assumed to be unintentional camera shake, and allowing for camera motion that is assumed to be intentional composition or framing of a photograph. Typically, high-frequency motion, for example oscillation faster than about 1 Hz, is assumed to be unintentional, while constant or low-frequency motion is assumed to be purposeful. For example, if a photographer in framing a photograph moves the camera slowly from one composition to another, the camera allows its field of view to track to the new composition. The camera continues to compensate for high-frequency oscillations, but does not completely compensate for the relatively low-frequency composition or aiming motions so that photographic composition can still be accomplished.

Due to the nature of motion control systems, there is a delay or settling time while the image stabilization system tracks to the new composition.

BRIEF DESCRIPTION OF THE DRAWINGS

FIG. 13 depicts an example capture sequence and the composition responsiveness chosen at each step of the sequence.

DETAILED DESCRIPTION

Figure 1:
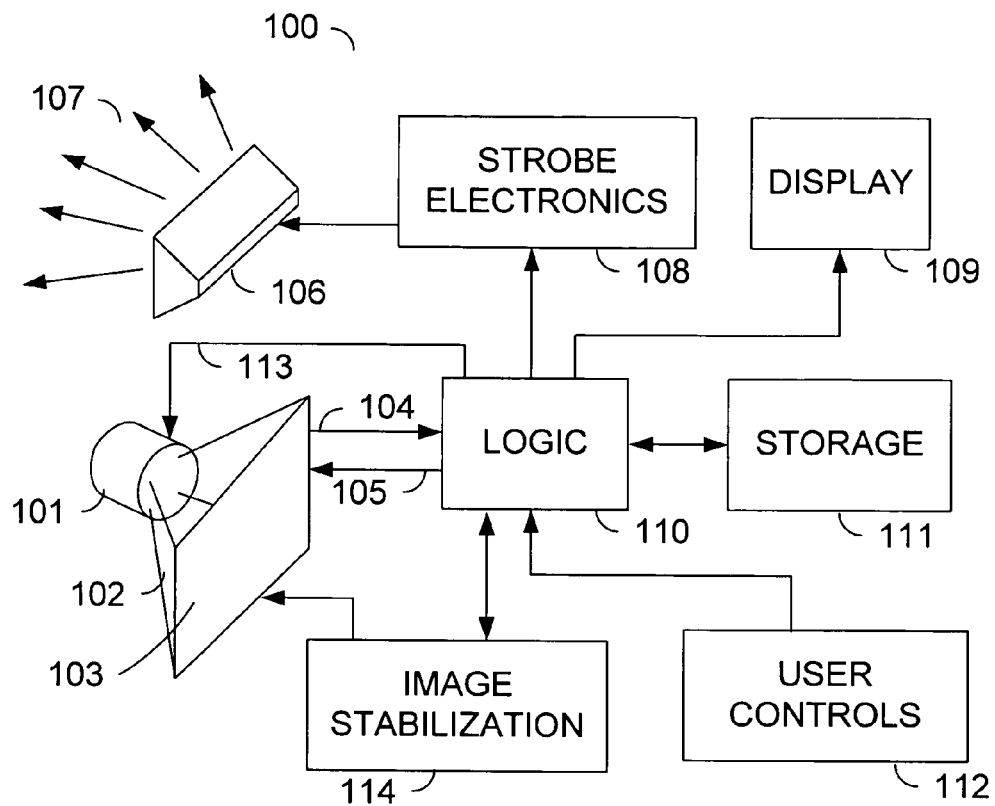
FIG. 1 shows a simplified block diagram of a digital camera in accordance with an example embodiment of the invention.

FIG. 1 shows a simplified block diagram of a digital camera. A lens 101 gathers light emanating from a scene, and redirects the light 102 such that an image of the scene is projected onto an electronic array light sensor 103. Electronic array light sensor 103 may be an array of charge coupled devices, commonly called a "CCD array", a "CCD sensor", or simply a "CCD". Alternatively, electronic array light sensor 103 may be an array of active pixels constructed using complementary metal oxide semiconductor technology. Such a sensor may be called an "active pixel array sensor", a "CMOS sensor", or another similar name. Other sensor technologies are possible. The light-sensitive elements on electronic array light sensor 103 are generally arranged in an ordered rectangular array, so that each element, or "pixel", corresponds to a scene location.

Image data signals 104 are passed to logic 110. Logic 110 interprets the image data signals 104, converting them to a numerical representation, called a "digital image." A digital image is an ordered array of numerical values that represent the brightness or color or both of corresponding locations in a scene or picture. Logic 110 may perform other functions as well, such as analyzing digital images taken by the camera for proper exposure, adjusting camera settings, performing digital manipulations on digital images, managing the storage, retrieval, and display of digital images, accepting inputs from a user of the camera, and other functions. Logic 110 also controls electronic array light sensor 103 through control signals 105. Logic 110 may comprise a microprocessor, a digital signal processor, dedicated logic, or a combination of these.

Storage 111 comprises memory for storing digital images taken by the camera, as well as camera setting information, program instructions for logic 110, and other items. User controls 112 enable a user of the camera to configure and operate the camera, and may comprise buttons, dials, switches, or other control devices. A display 109 may be provided for displaying digital images taken by the camera, as well as for use in conjunction with user controls 112 in the camera's user interface. A flash or strobe light 106 may provide supplemental light 107 to the scene, under control of strobe electronics 108, which are in turn controlled by logic 110. Logic 110 may also provide control signals 113 to control lens 101. For example, logic 110 may adjust the focus of the lens 101, and, if lens 101 is a zoom lens, may control the zoom position of lens 101.

Image stabilization block 114 actuates sensor 103 in response to camera motions, and is in turn controlled by logic 110. Image stabilization block 114 receives control information from logic 110, and may communicate status information or other data to logic 110.

Figure 2:
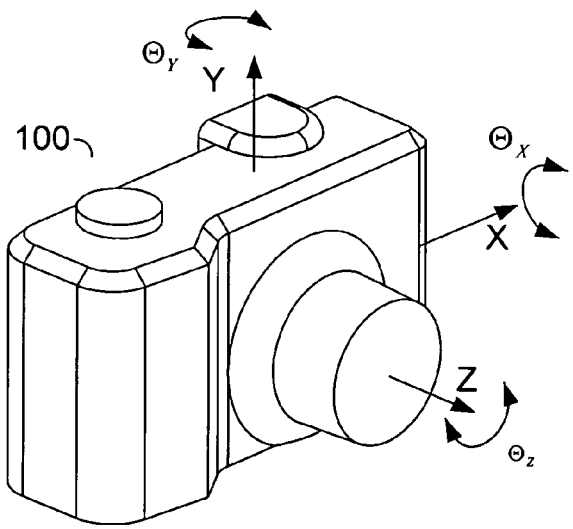
FIG. 2 shows a perspective view of the camera of FIG. 1, and illustrates a coordinate system convenient for describing motions of the camera.

FIG. 2 shows a perspective view of digital camera 100, and illustrates a coordinate system convenient for describing motions of camera 100. Rotations about the X and Y axes, indicated by rotation directions $\Theta_X$ and $\Theta_Y$ (often called pitch and yaw respectively), are the primary causes of image blur due to camera shake. Rotation about the Z axis and translations in any of the axis directions are typically small, and their effects are attenuated by the operation of the camera lens because photographs are typically taken at large inverse magnifications.

Figure 3:
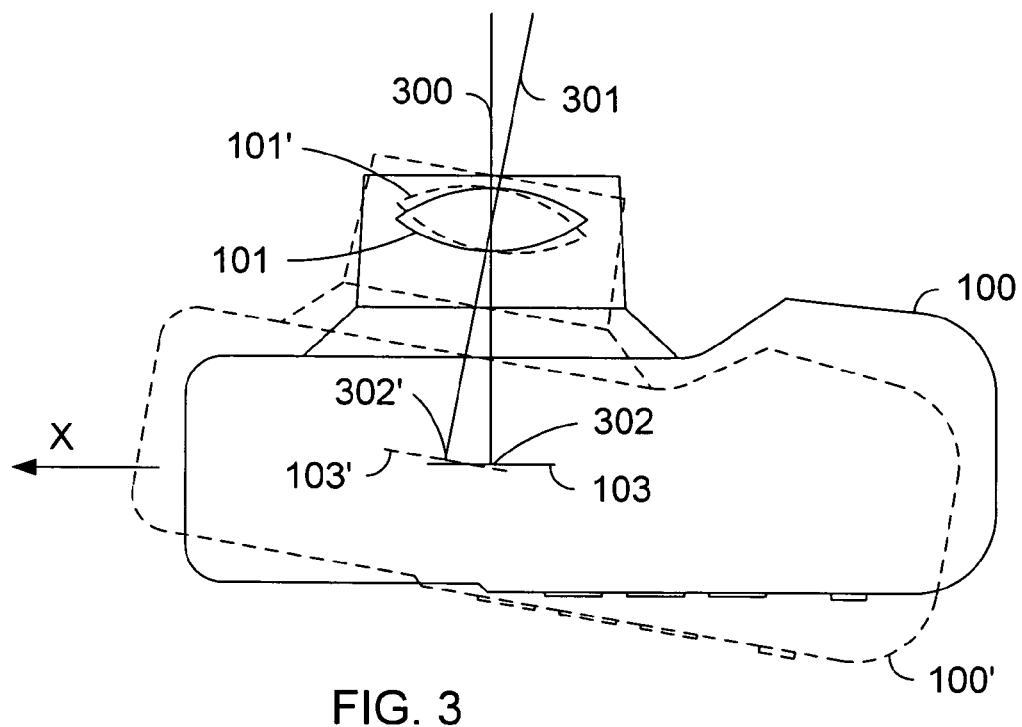
FIG. 3 shows a schematic top view of the camera of FIG. 1, and illustrates how camera rotation can cause image blur.

FIG. 3 shows a schematic top view of camera 100, and illustrates how camera rotation can cause image blur. FIG. 3 and the following discussion of it assume that image stabilization is not enabled. In FIG. 3, camera 100 is shown in an initial position depicted by solid lines, and in a position, depicted by broken lines, in which camera 100 has been rotated about the Y axis. The reference numbers for the camera and other parts in the rotated position are shown as "primed" values, to indicate that the referenced items are the same items, shifted in position. In FIG. 3, a light ray 300 emanating from a particular scene location, passes through lens 101 and impinges on sensor 103 at a particular location 302. If the camera is rotated, the light ray is not affected in its travel from the scene location to the camera. (Its travel within the camera, after it encounters lens 101' may be slightly affected, depending on the point of rotation of the camera. It is shown as unaffected in FIG. 3, as if the camera has been rotated around the lens nodal point, but even if the camera is rotated about a different point so that there is a deviation of ray 300, the deviation is generally small enough to be neglected by an image stabilization system.) However, sensor 103 moves to a new position, indicated by sensor 103'. The light ray, emanating from the same scene location, now impinges on sensor 103' at a different sensor location than where it impinged on sensor 103, because position 302 has moved to position 302'. If the rotation occurs during the taking of a photograph, then each of the sensor locations where the light ray impinged will have collected light from the same scene location. A photograph taken during the rotation will thus be blurred.

If image stabilization is enabled and sensor 103 is made to move within the camera by an amount just sufficient to keep the sensor position 302 in the path of light ray 300, then the mapping of scene locations to sensor locations can be held substantially fixed, and a sharp photograph can be taken even though the camera may be rotating. Rotations caused by camera shake are typically small, and translation of the sensor in the camera's X-direction is sufficient to substantially counter rotations of the camera about the Y axis. Similarly, translation of the sensor in the Y-direction is sufficient to substantially counter rotations of the camera about the X axis.

However, if the rotation shown is deliberate on the part of the photographer in the composition of a photograph, then it is desirable that the sensor 103 rotate with camera 100, so that the camera aims along ray 301.

Figure 4:
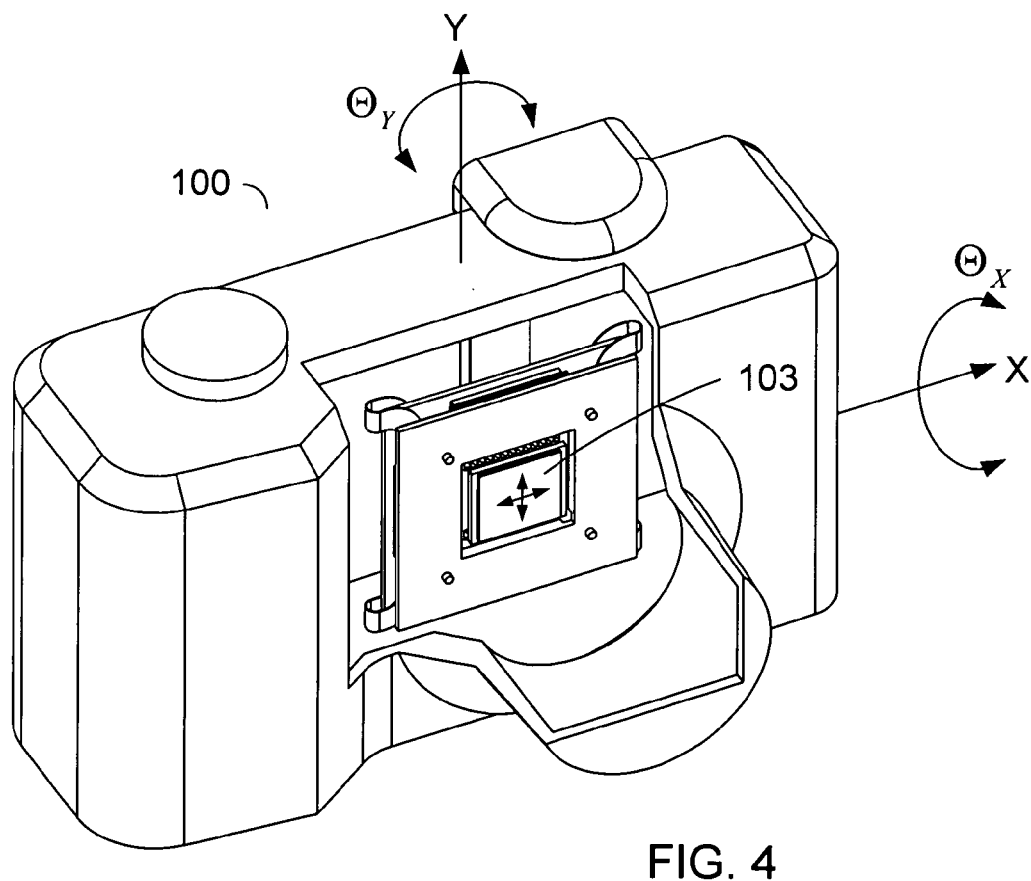
FIG. 4 depicts a cutaway and simplified perspective view of the camera of FIG. 1, comprising an image stabilization system in accordance with an example embodiment of the invention.

FIG. 4 depicts a cutaway and simplified perspective view of camera 100 comprising an image stabilization system in accordance with an example embodiment of the invention. The lens elements and much of the internal support structure and electronics of example camera 100 are omitted from FIG. 4 for clearer viewing. Camera 100 comprises electronic array light sensor 103, which can translate in the X and Y directions. An appropriate actuator (not shown) drives sensor 103 in response to rotations of the camera about the Y and X axes in order to compensate for camera shake. Sensor 103 may be, for example, a Sony ICX282AK CCD sensor, or another similar kind of sensor.

One of skill in the art will recognize that camera 100 is presented by way of example, and that the invention may be embodied in a camera that performs active image stabilization by any method, including moving an optical element or sensor by use of a linear motor, voice coil actuator, piezoelectric device or other actuator, and also including dynamic selection of a subregion of a sensor image.

Figure 5:
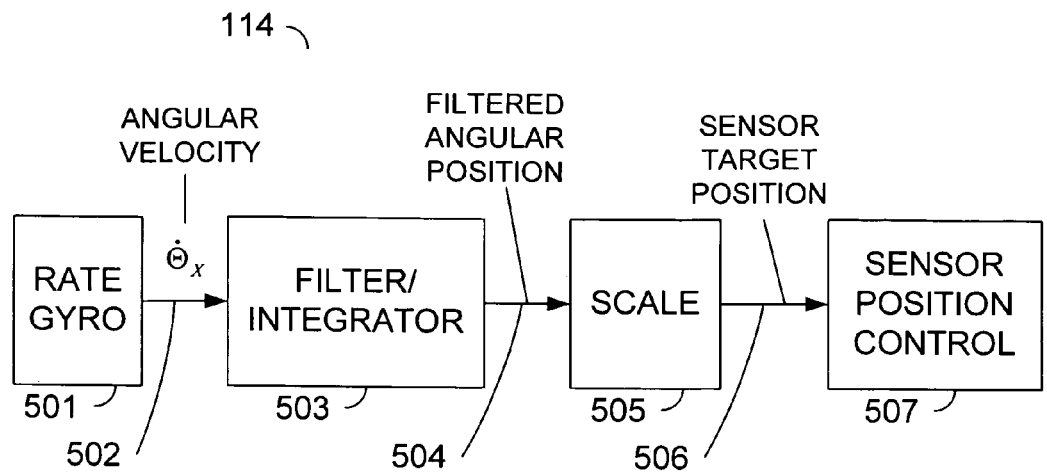
FIG. 5 shows a simplified block diagram of a control system in accordance with an example embodiment of the invention for controlling the motion of a sensor in one axis.

FIG. 5 shows a simplified block diagram of an example control system 500, a subset of image stabilization block 114, for controlling the motion of sensor 103 in one axis. For example, control system 500 may move sensor 103 in the X axis to compensate for camera yaw. Control system 500 may be substantially duplicated for moving sensor 103 in the Y axis to compensate for camera pitch.

In control system 500, rate gyroscope 501 senses the rate of camera rotation. Rate gyroscope 501 may be, for example, a model EMC-03MA rate gyroscope available from Murata Manufacturing Co., Ltd., of Kyoto, Japan. Rate gyroscope 501 produces an angular velocity signal 502, which is a voltage proportional to the angular velocity of camera 100. Camera rotation may be measured by other means as well, for example by a rotational accelerometer with appropriate signal conditioning.

Filter/integrator block 503 processes the angular velocity signal 502 to produce an angular position signal 504. Because rate gyro 501 produces a signal proportional to the angular velocity of camera 100 and image stabilization uses angular position information, filter/integrator block 503 integrates and filters the angular velocity signal 502 to produce angular position signal 504. Angular position signal 504 is scaled in scale block 505 to account for, for example, the lens focal length in use. The scaled angular position signal is a sensor target position signal 506, indicating a target for the position of sensor 103 in relation to the rest of camera 100. Target position signal 506 is sent to a sensor position control block 507. Sensor control block 507 may be designed using techniques known in the art, and actuates sensor 103 to generally track the target position.

Of particular interest in this disclosure is the dynamic behavior of angular position signal 504 as a function of the rotation of camera 100. Even if sensor position control 507 were to cause sensor 103 to track target position 506 perfectly, the image stabilization performance and the perceptions of a user of camera 100 are affected by the dynamic behavior of angular position signal 504.

Filter/integrator 503 comprises a high-pass filter so that signal components resulting from high-frequency camera motion are passed through and compensated by sensor position control 507, while signal components resulting from low-frequency camera motion, such as intentional movements of the camera for scene composition, are attenuated. And as has been described, filter/integrator 503 comprises an integrator for converting angular velocity information to angular position information.

However, because the filtering may not perfectly suppress intentional camera motions from angular position signal 504, some low-frequency motion may be integrated, causing unwanted sensor motion and incorrect scene composition. If the integration were perfect, it would not be possible to correct the scene composition. For this reason, it is desirable that the integration be "leaky". That is, sensor 103 is allowed to drift back toward a nominal or center position so that the scene being photographed is generally centered on the camera's optical axis, as a camera user expects.

For the purposes of this disclosure, the rapidity with which the camera returns to its nominal position is called the composition responsiveness of the system. If the composition responsiveness is too slow, a user will be unable to compose photographs quickly. If the composition responsiveness is too fast, the quality of image stabilization is compromised because the return of sensor 103 to its nominal position is itself sensor motion that is not responsive to camera shake.

In previous cameras, the filter characteristic and composition responsiveness are set to a compromise performance selected by the designer of the camera. However, this compromise performance may not provide optimal photographic results or user perception over a range of photographic situations. For example, in photographing a brightly-lit scene, the use of a fast shutter speed may obviate the need for image stabilization, and a relatively slow composition response may be an unneeded hindrance to rapid framing of photographs. Similarly, a camera user photographing a sporting event may be more concerned with blur caused by subject motion than blur caused by camera shake, and may wish for faster composition responsiveness than the camera provides. Conversely, in photographing a dimly-lit scene using a long exposure time, a slower composition responsiveness than provided by the camera could produce photographs with less blur than photographs taken using the camera's designed compromise performance.

In accordance with an example embodiment of the invention, the composition responsiveness of a camera is adjustable, and may be adjusted in response to a particular photographic situation, including scene conditions, camera optical configurations, camera mode settings, or any combination of these. For example, the camera may select a faster composition responsiveness for brighter scenes where blur due to camera shake is unlikely to occur, and may select a slower composition responsiveness for dimly-lit scenes so as to maximize the effectiveness of image stabilization. Similarly, the camera may select a faster composition responsiveness when the camera's lens is set to a relatively short focal length, and may select a slower composition responsiveness when the camera's lens is set to a longer focal length, because motion blur is often troublesome when long focal lengths are used.

Many cameras provide a set of exposure modes selectable by a user of the camera. The modes configure the camera to select settings appropriate for the indicated subject matter. For example, if a user selects a "landscape" mode, the camera may select aperture and shutter speed settings that tend to maximize depth of field while still allowing for handheld operation. A "portrait" mode may select settings that tend to minimize depth of field and set the camera for spot metering. A camera in accordance with an example embodiment of the invention may adjust its composition responsiveness to the camera mode setting. For example, if an "action" mode is selected, the camera may select a faster composition responsiveness than when a "landscape" mode is selected. The faster responsiveness in the "action" mode enables quick composition of photographs of a sporting event or other action, while the slower responsiveness of the "landscape" mode, usually used when subjects are unlikely to be in motion, enables enhanced image stabilization performance.

Figure 6:
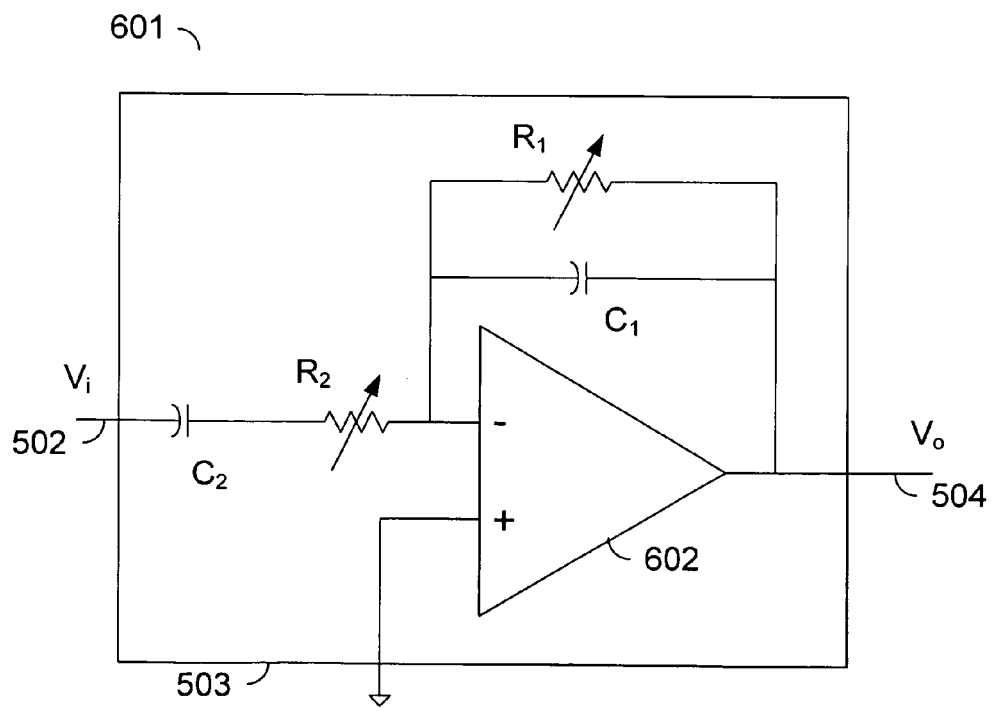
FIG. 6 depicts a schematic of one example implementation of a filter/integrator.
Figure 7:
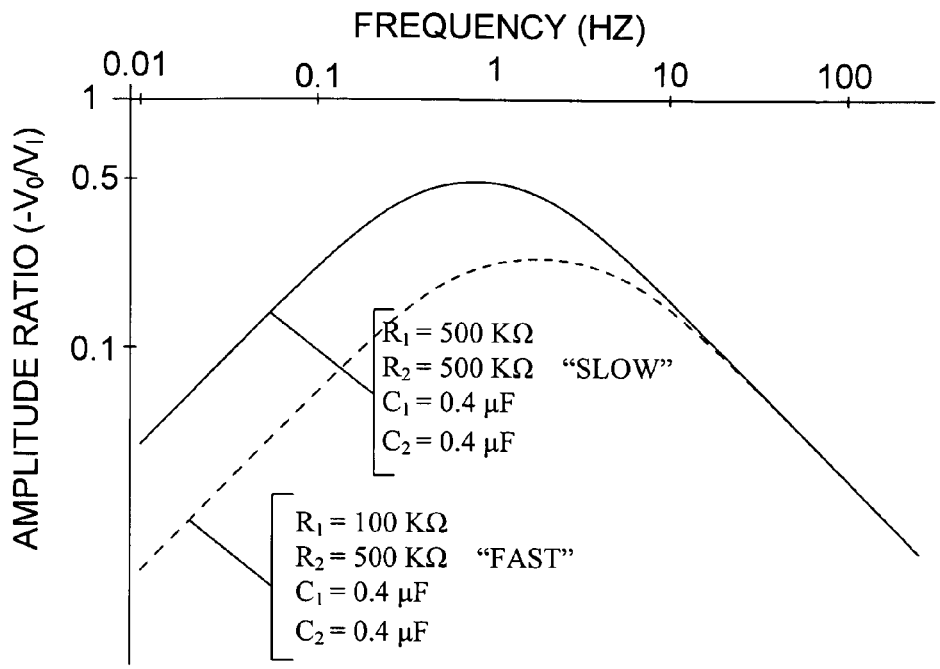
FIG. 7 shows the frequency response of the example circuit of FIG. 6 in two configurations.

Many systems and techniques are possible for adjusting the composition responsiveness of a camera. FIG. 6 depicts a schematic of one example implementation 601 of filter/integrator 503, based on operational amplifier 602. Resistors $R_1$ and $R_2$ may be, for example, electronically controllable resistors under the control of logic 110 or other logic in image stabilization block 114. FIG. 7 shows the frequency response of the circuit of FIG. 6 in two configurations. In a first "slow" configuration, $R_1=R_2=500$ KΩ and $C_1=C_2=0.4$ µF. In a second "fast" configuration, $R_1=100$ KΩ, $R_2=500$ KΩ and $C_1=C_2=0.4$ µF. As is shown by FIG. 7, the circuit of FIG. 6 is a high-pass filter for lower frequencies typically associated with intentional composition, and is an integrator for higher frequencies typically associated with camera shake. The "fast" configuration has a cutoff frequency of about 1 Hz, while the "slow" configuration has a cutoff frequency somewhat lower.

Figure 8:
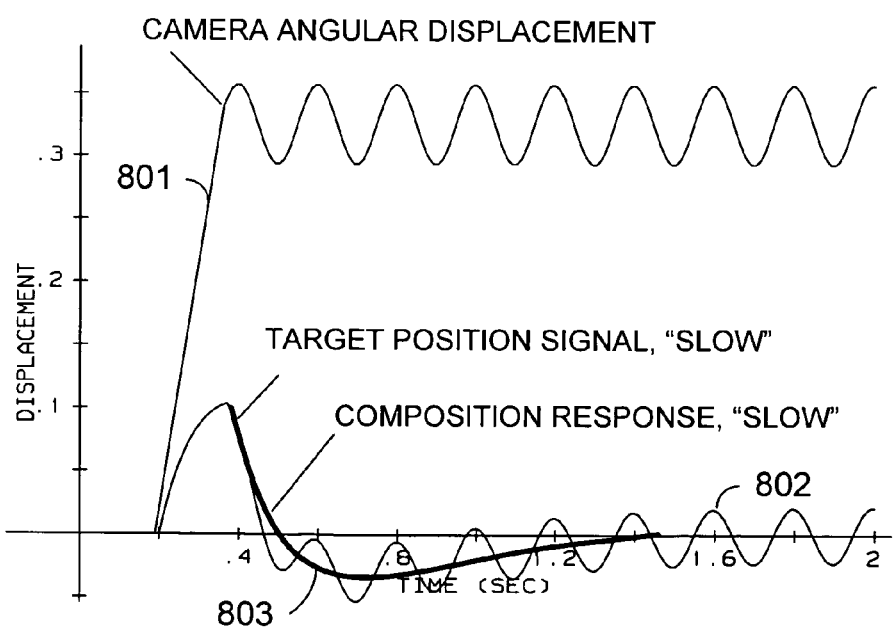
FIG. 8 shows the image stabilization response of the example filter/integrator implementation of FIG. 6 in a "slow" configuration.

FIG. 8 shows the image stabilization response of filter/integrator implementation 601 in the "slow" configuration. Camera angular position curve 801 represents a composition motion followed by a relatively high frequency oscillation representing camera shake. Target position curve 802 shows that filter/integrator 601 in this configuration at first tries to follow the composition motion, resulting in a transient response, but then moves the sensor target position back toward its nominal position roughly along composition response curve 803. In this first configuration, it takes about 1.2 seconds after the end of the composition move for the camera to fully follow the photographic composition. This represents a relatively slow composition responsiveness. Note that in both FIGS. 8 and 9, the vertical scale is arbitrary, and the target position signal is not necessarily in the same vertical scale as the camera angular displacement.

Figure 9:
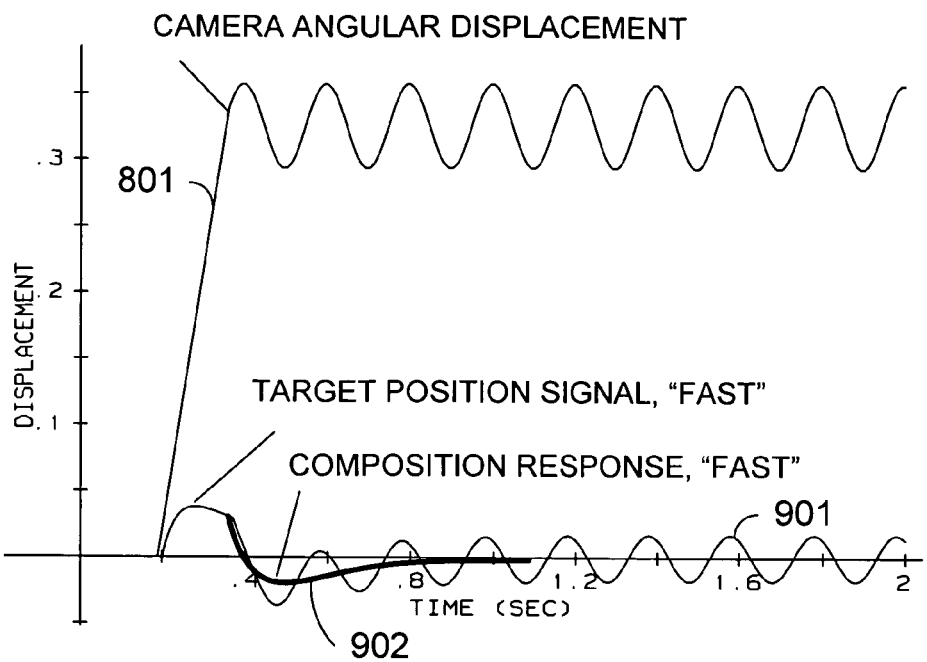
FIG. 9 shows the image stabilization response of the example filter/integrator implementation of FIG. 6 in a "fast" configuration.

FIG. 9 shows the image stabilization response of example filter/integrator implementation 601 in the "fast" configuration. In FIG. 9, the camera responds to the same angular position curve 801 as was shown in FIG. 8. Target position curve 901 shows that the "fast" configuration of filter/integrator 601 has discounted the transient composition motion more quickly than the "slow" configuration did. In addition, the "fast" configuration returns sensor 103 to its nominal or center position more quickly, as is shown by composition response curve 902. In this example, it takes about 0.6 seconds after the end of the composition move for the camera to fully follow the photographic composition. After the composition has been followed, both configurations continue to indicate that the relatively high-frequency camera shake motion is occurring, and should be compensated by sensor position control 507.

Figure 10:
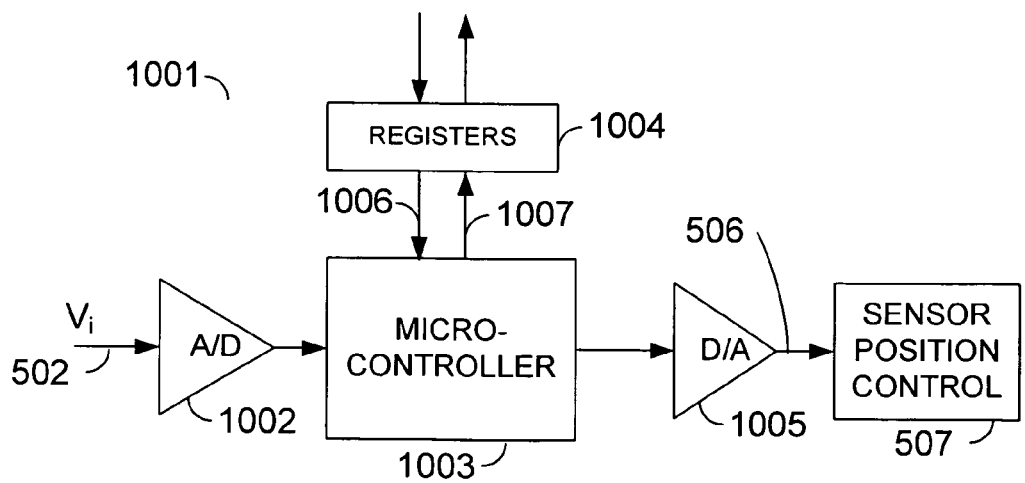
FIG. 10 shows a digital implementation for a control system in accordance with an example embodiment of the invention for controlling the motion of a sensor in one axis.

Analog example implementation 601 of filter/integrator 503 is only one of many possible implementations. Preferably, filter/integrator 503 is implemented digitally. FIG. 10 shows an example digital implementation 1001 for a control system for controlling the motion of sensor 103 in one axis. Analog-to-digital converter 1002 converts angular velocity signal 502 to digital form, suitable for processing by a microcontroller 1003. Microcontroller 1003 may comprise, for example, a central processing unit, memory, and input/output ports, and executes a program for computing sensor target position 506. Preferably, microcontroller receives configuration information 1006 from a set of registers 1004, which in turn communicate with camera logic 110. The registers 1004 may be implemented using any convenient method. For example, they may be implemented in hardware, or may be allocated in random access memory (RAM) or flash memory in a data structure defined by firmware executed by microcontroller 1003. The configuration information may comprise, for example, an indication of the current lens focal length so that microcontroller 1003 can perform the scaling function 505 digitally. The configuration information may also comprise parameter settings that allow microcontroller 1003 to alter the composition responsiveness of camera 100. The composition responsiveness may be adjusted by modifying an algorithm performed by microcontroller 1003. Modifying an algorithm may comprise, for example, changing coefficients in a formula for computing sensor target position 506 based on angular velocity signal 502. Microcontroller 1003 may also return status information 1007 through registers 1004 to other camera logic. The result of the computation of microcontroller 1003 may be converted to an analog value by digital-to-analog converter 1005.

Figures 11, 12:
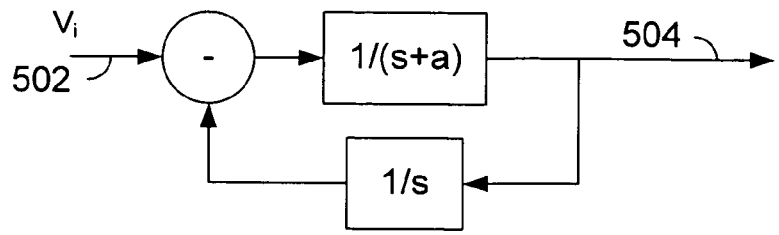
FIG. 11 shows a simplified block diagram of such a filter/integrator that can be underdamped.
FIG. 12 depicts an abbreviated and simplified exposure program table in accordance with an example embodiment of the invention.

In one example digital implementation, microcontroller 1003 may simply emulate analog circuit 601 using techniques known in the art. Or microcontroller 1003 may emulate a different analog circuit or other dynamic system, for example one that provides a slightly underdamped response. FIG. 11 shows a simplified block diagram of such a filter/integrator, using notation familiar to those skilled in the art. The system of FIG. 11 may be implemented using analog circuitry or digitally. By choosing an appropriate value for the parameter "a", a system designer can adjust the system performance and may select a value for "a" that makes the system underdamped. An underdamped system may provide a sensor target position signal 506 with somewhat better phase alignment to a camera shake motion than is provided by a system implemented using circuit 601.

Many other algorithms are also possible within the scope of the appended claims for determining the sensor target position 506. For example, rather than emulating a conventional linear system such as circuit 601, microcontroller 1003 may implement an algorithm that is nonlinear, heuristic, adaptive, ad hoc, slew-rate limited, or some combination of these. Any of these kinds of algorithms may be capable of discriminating intentional from unintentional camera motion, and of adjusting the composition responsiveness of camera 100.

In one preferred embodiment, camera 100 stores parameters for the image stabilization system 114 in one or more exposure program tables. An exposure program table is a data structure used by a camera for selecting photographic settings based on one or more measured parameters of a scene. A camera may have a different exposure program table for each mode. That is, a camera my have a table for a "portrait" mode, a table for "landscape" mode, and other modes. A common measured parameter for indexing an exposure program table is the scene brightness. For example, if a camera is set in "landscape" mode and measures a scene to be of a particular brightness, the camera's logic can look up in the table such settings as an appropriate aperture size, the proper shutter speed, whether to use flash, and other parameters that will result in a proper exposure for the photograph. FIG. 12 depicts an abbreviated and simplified exposure program table in accordance with an example embodiment of the invention. The table in FIG. 12 and may be used by a "point and shoot" digital camera in a "landscape" mode, wherein the camera keeps shutter speed faster than ⅛ second to enable handheld operation with image stabilization, and maximizes the depth of field in resulting photographs. A lower scene brightness BV corresponds to a darker scene. Once the camera has metered the scene and determined BV, it can select camera settings from the table in order to further the goals of the mode setting. In the example table of FIG. 12, the composition responsiveness of the camera is one of the settings. Placing the composition responsiveness of the camera in the exposure program tables enables the camera designer to readily configure the operation of the various camera modes, thereby adjusting the operation of the camera to improve the camera user's experience. While the table of FIG. 12 shows aperture settings in terms of a lens F-number and shutter speeds in seconds, an actual table may contain values in other units selected by a camera designer to represent those settings. Similarly, composition responsiveness in the table may be represented by electronic component values or indicia of responsiveness selected by the camera designer. Other entries are possible as well. For example, one entry may indicate the cutoff frequency of the filter in filter/integrator 503, while another indicates the speed at which the camera tracks its image stabilization system to a center or nominal position. An entry may indicate the responsiveness of the system by specifying a settling time constant for the system.

In one useful aspect of at least some implementations, the composition responsiveness of camera 100 may be adjusted during image stabilization. For example, if the resistance value of either or both of variable resistors $R_1$ and $R_2$ in circuit 601 is changed, the composition responsiveness of camera 100 changes as a result, and changes in such a way that no significant transients are introduced in the motion of sensor 103. Similarly, in a digital implementation, microcontroller 1003 may alter its computation during image stabilization so that the composition responsiveness of camera 100 changes, preferably without significant motion transients.

In many cameras, a camera user initiates the taking of a photograph by pressing a shutter release button. "Shutter release" is the common name for this control, even though a modern digital camera may not comprise a mechanical shutter. In some cameras, the shutter release button sequentially actuates two switches or other sensors as it is pressed, each switch placing the camera in a different state. These two states may be called S1 and S2. For example, in some cameras, pressing the shutter release to the S1 position causes the camera to perform automatic focusing and to compute the proper camera exposure settings based on a measurement of the brightness of the scene the camera is viewing. Often, once the focus and exposure settings are determined, they remain "locked" so that the photographer can recompose the photograph without changes in the settings. When the shutter release is further pressed to the S2 position, the camera takes a photograph using the focus and exposure settings that were determined in the S1 state. In some cameras, image stabilization is also initiated when the camera enters the S1 state, and continues until a photograph has been taken or until some time thereafter. The camera behavior at a sequence of states may be called a capture sequence. The sequence of states may comprise S1 and S2, and may also comprise a state that occurs before S1 and a state that occurs after S2.

In accordance with another example embodiment of the invention, the composition responsiveness of a camera is adjusted during the capture sequence used to take a photograph. For example, if image stabilization is enabled before the S1 state is reached, the camera may be configured for a relatively fast composition responsiveness so that the photographer can rapidly compose photographs. Once S1 is reached and autofocus begins, the camera may be configured for a relatively slow composition responsiveness.

Using a relatively slow composition responsiveness during autofocusing may have two or more advantages. In many digital cameras, autofocusing is performed by measuring a spatial contrast metric of a set of trial digital images taken by the camera, and adjusting the position of a lens component in response to the contrast metric measurements. For example, the spatial contrast metric may be the sum of the squares of the differences between adjacent pixels of like color, computed for a region of the camera's field of view. The region, which may comprise all or a portion of the camera's entire field of view, may be called a "focus window". Camera motion may cause blurring or smearing of the image during autofocus, reducing the value of the contrast metric and making autofocus more difficult. Using a relatively slow composition responsiveness causes the camera to track camera motion more accurately, and may improve autofocus by reducing the blurring or smearing. Additionally, autofocus may be compromised if camera motion causes a high-contrast object to move into and out of the focus window during autofocus. A high-contrast object may contribute substantially to the spatial contrast metric, and its intermittent presence may cause the metric to misrepresent the quality of focus of the rest of the image. A relatively slow composition responsiveness may improve autofocus by maintaining a relatively constant viewing direction for the focus window so that substantially the same scene objects are used for each trial digital image.

Other changes to the camera's composition responsiveness during the capture sequence may provide other advantages. For example, once autofocusing is completed, the camera may be configured for a relatively fast composition responsiveness to enable quick recomposition of a photograph during focus lock. When camera state S2 is reached, indicating that a photograph should be taken, the camera may be configured once again for a relatively slow composition responsiveness so that more camera motion is compensated during the exposure when any motion blur would result in a photograph of reduced sharpness.

These composition responsiveness changes may be enabled in various combinations. For example, a camera may maintain a relatively fast composition responsiveness throughout the S1 state, including during autofocus, and switch to a relatively slow composition responsiveness only when S2 is reached. Other combinations are possible as well.

FIG. 13 depicts one example capture sequence and the composition responsiveness chosen at each step of the sequence. At state 1301, the camera is idle. That is, the shutter release has not yet been pressed, and the camera user may be viewing a scene through the camera's viewfinder and composing or framing a photograph. In this example sequence, the camera is set to a relatively fast composition responsiveness during this state. At state 1302, the shutter release has been pressed to the S1 state, and automatic focusing is in progress. The camera is set to a relatively slow composition responsiveness during this state. At state 1303, automatic focusing has been completed. The shutter release is still at the S1 position, so the focus setting is locked and the camera user can re-frame the photograph. The camera is set to a relatively fast composition responsiveness during this state. At state 1304, the user has pressed the shutter release to the S2 position, indicating that a photograph should be taken. During the photographic exposure, the camera is set to a relatively slow composition responsiveness. At state 1305, the exposure has been completed, and the camera is set to a relatively fast composition responsiveness in preparation for a possible next photograph.

Preferably, the adjustments in composition responsiveness are implemented in a way that doesn't introduce unwanted transients in the motion of the moving image stabilization component. For example, changes in the values of resistors $R_1$ and $R_2$ of the circuit of FIG. 6 can accomplish this. Similarly, changes to an algorithm executed by a digital image stabilization system such as digital implementation 1001 can provide well-controlled transitions between composition responsiveness settings.

The invention claimed is:

1. A method of image stabilization, comprising adjusting a composition responsiveness of a camera during a capture sequence in response to a particular photographic situation including a scene condition, a camera optical configuration, and a camera mode setting, or a combination of at least two of the photographic situations, wherein the composition responsiveness is rapidity with which the camera returns to a nominal position wherein adjusting the composition responsiveness of the camera during the capture sequence further comprises: configuring the camera for a first composition responsiveness for use during automatic focusing; and configuring the camera for a second composition responsiveness for use after automatic focusing is completed; and wherein adjusting the composition responsiveness of the camera during the capture sequence further comprises configuring the camera for a third composition responsiveness for use during the taking of a photograph.

2. The method of claim 1, wherein the first composition responsiveness is slower than the second.

3. The method of claim 1, wherein the third composition responsiveness is slower than the second.

4. The method of claim 1, wherein the third composition responsiveness is equal to the first.

5. The method of claim 1, wherein adjusting the composition responsiveness of the camera during the capture sequence further comprises: configuring the camera for a first composition responsiveness for use during composition of a photograph; and configuring the camera for a second composition responsiveness for use during the taking of the photograph.

6. The method of claim 5, wherein the first composition responsiveness is faster than the second.

7. The method of claim 1, wherein adjusting the composition responsiveness during a capture sequence further comprises adjusting the composition responsiveness of the camera during image stabilization.

8. The method of claim 1, wherein adjusting the composition responsiveness further comprises adjusting a filter frequency response.

9. The method of claim 1, wherein adjusting the composition responsiveness further comprises adjusting the value of a component of an electronic circuit.

10. The method of claim 1, wherein adjusting the composition responsiveness further comprises modifying an algorithm performed by a digital system.

11. A camera, comprising an active image stabilization system having a composition responsiveness, the camera configured to adjust the composition responsiveness during a capture sequence and during image stabilization, wherein the composition responsiveness is rapidity with which the camera returns to a nominal position further comprising an automatic focus capability, and wherein: a first composition responsiveness is selected for use during focusing; and a second composition responsiveness is selected for use after focusing is completed, and further configured to select a third composition responsiveness for use during the taking of the photograph.

12. The camera of claim 11, wherein the image stabilization system further comprises a filter, and wherein the composition responsiveness is adjusted by modifying a frequency response of the filter.

13. The camera of claim 11, wherein the image stabilization system is implemented digitally.

14. The camera of claim 11, wherein the first composition responsiveness is slower than the second.

15. The camera of claim 11, wherein the third composition responsiveness is slower than the second.

16. The camera of claim 11, wherein the third composition responsiveness is equal to the first.

17. The camera of claim 11, further configured to: select a first composition responsiveness for use during composition of a photograph; and select a second composition responsiveness for use during the taking of a photograph.

18. The camera of claim 17, wherein the second composition responsiveness is slower than the first.

19. The camera of claim 11, wherein the camera is a digital camera.

20. The camera of claim 19, wherein the camera performs image stabilization by moving an electronic array light sensor with respect to a lens, in response to camera motion.

21. The camera of claim 11, wherein the camera is a film camera.

22. The camera of claim 11, wherein the camera performs image stabilization by moving an optical component comprised in a lens, in response to camera motion.

23. The camera of claim 11, wherein the camera performs image stabilization by dynamically selecting, in response to camera motion, a subregion of a sensor from which to take a photograph.

* * * * *